C. G. HERRICK.
EYE TESTING DEVICE.
APPLICATION FILED JUNE 19, 1916.

1,228,020.

Patented May 29, 1917.

Inventor
Charles G. Herrick,
Royal E. Burnham,
Attorney

Witness
Chas. L. Greshauer

UNITED STATES PATENT OFFICE.

CHARLES G. HERRICK, OF INDEPENDENCE, IOWA.

EYE-TESTING DEVICE.

1,228,020.  Specification of Letters Patent.  Patented May 29, 1917.

Application filed June 19, 1916. Serial No. 104,549.

*To all whom it may concern:*

Be it known that I, CHARLES G. HERRICK, a citizen of the United States, residing at Independence, in the county of Buchanan and State of Iowa, have invented certain new and useful Improvements in Eye-Testing Devices, of which the following is a specification, reference being had therein to the accompanying drawings.

This invention relates to a device for displaying eye-glasses, spectacles, and the like, and for use in bringing articles of this kind having lenses of varying strength or other characteristics into the line of vision of a person to be fitted with glasses.

It is an object of the invention to construct, form, and arrange a device of this character in such manner that the person desiring glasses may himself use the same to ascertain what glasses are best suited to his needs. Moreover, the arrangement is such that an almost unlimited number of glasses may be used in this manner in the device, in order that all glasses that might be suited to a person's eyes may be brought to his line of vision for trial. Further, the invention provides means whereby glasses may be held at the same time in position for both display and trial.

When read in connection with the description herein, the details of construction and arrangement of parts contemplated by the invention will be apparent from the accompanying drawings, forming part hereof, wherein an embodiment of the invention is disclosed, for purposes of illustration.

While the disclosures herein now are considered to exemplify a preferable embodiment of the invention, it is to be understood that it is not the intention to be limited necessarily thereto in interpretation of the claims, as alterations and adaptations within the limits of the claims can be made without departing from the nature and spirit of the invention.

Like reference-characters refer to corresponding parts in the views of the drawings, of which—

Figure 1:
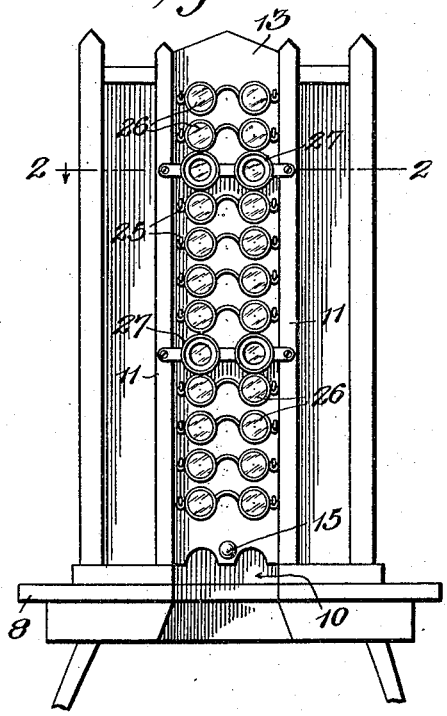
Figure 1 is a front elevation.
Figure 3:
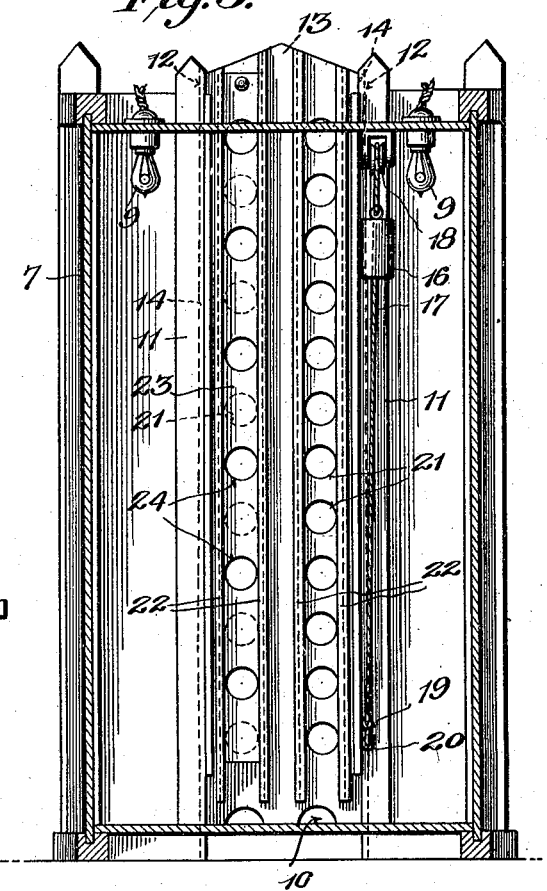
Fig. 3 is a vertical sectional view looking toward the front.
Figure 2:
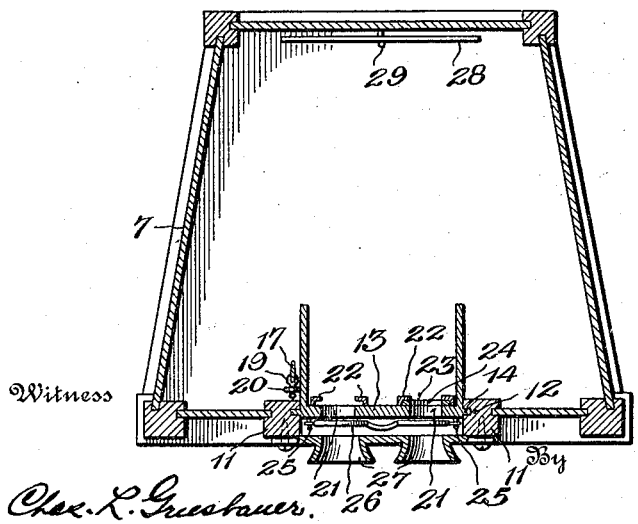
Fig. 2 is a horizontal sectional view on the line 2—2, Fig. 1.

Having more particular reference to the drawings, 7 designates a case, preferably made of wood and rectangular in general outline, arranged to be supported by a table or other suitable base 8. The case is closed at the top, bottom, and sides, except as hereinafter described. The interior surface of the walls of the case is painted a flat white, and the interior is lighted by one or more lamps 9, electric lamps preferably being used.

A centrally-positioned vertical opening 10 extends from top to bottom of the front wall of the case. A post 11 is positioned at each side of the opening, and these posts are formed with oppositely-disposed guideways 12. A slide 13 normally closes the opening 10, and it has at each side a laterally-extending flange 14 arranged to seat in one of the guideways 12 and thereby guide the slide in its vertical movement. A knob 15 is secured to the slide near the bottom to afford a hold for causing movement of the slide. The slide is balanced by a counter-weight 16 vertically movable at the side of the interior of the case and attached at one end of a cord 17 roven through a sheave 18 near the top of the case and having at its other end a hook or the like 19 arranged to removably engage a screw-eye or the like 20 near the bottom of the slide.

The slide is formed with a plurality of pairs of sight-openings 21 arranged successively in series one above another from near the bottom to near the top, the openings of each pair having their centers the distance apart of the axes of the lenses of the usual run of eye-glasses and sufficiently large to permit alinement therewith of lenses of wide and narrow glasses. On the face of the slide normally inside of the case there is for each vertical series of sight-openings 21 a pair of guideways 22 arranged to receive the side marginal portions and to guide a strip of sheet material 23 adapted to close the openings. Each of the closing-strips may have one or more sight-openings 24 of the size of and positioned to be brought to alinement with any one of the sight-openings 21 of the series to which the strip pertains.

At each side of each pair of sight-openings 21 the slide has on its outer face a hook 25 or other suitable support adapted to engage and removably hold one of a series of glasses, spectacles, or the like 26 with its lenses in registry with the openings.

One or more pairs of eye-tubes 27 are secured to the posts 11 in such position that there are lines of vision through the tubes and openings in the slide. At least one of the pairs of eye-tubes is placed at the height of the eyes of the average person when seated before the case, so that he may easily look through them, and others may be placed at other positions for taller and shorter adults and for children. A test-card 28 is hung at the rear of the interior of the case on a support 29 at the usual distance of fourteen inches from the lenses on the slide.

This device is susceptible of use unassisted by a person desiring glasses in order to determine the one having lenses best suited to him, the glasses being identified, if desired, by numerals in proximity to them on the slide. The user, being seated before the case, moves the slide up and down until he finds the glasses containing the proper lenses, and any number of slides carrying glasses of varying characteristics may be placed successively in operative position in the case until the proper glasses are determined. When it is desired to test one eye alone, the series of sight-openings opposite to the other eye may be closed by one of the closing-strips 23; and, if it is desired during the testing of a single eye also to look through a lens opposite to the other eye, the opening opposite to that eye may be opened by bringing one of the openings 24 of the strip in alinement therewith.

It is to be observed that the construction and arrangement of the various parts of this invention are such that the actual glasses, spectacles, or the like that a person that tests his own eyes will require and acquire are used in the tests, thus avoiding the liability of mistake in obtaining the correct lenses such as may occur when irremovable lenses for test purposes are used and other lenses given that are supposed to correspond exactly therewith. Moreover, it is unnecessary to handle the glasses during their inspection and trial, and thus they do not become finger marked or injured in any way. Further, in view of the fact that the glasses, spectacles, and the like are themselves made available for test purposes by this device, a dealer is saved the expense of carrying in stock the large number of separate lenses ordinarily required for eye-testing purposes. In addition, as any desired or required number of slides suitable for use in the device may be kept on hand, those slides may be used separately from the device for holding and displaying the articles in show-windows, counter-cases, on shelves, and elsewhere, from which positions they may be taken at any time for test use in the device.

Having thus described my invention, what I claim as new, and desire to secure by Letters Patent, is—

1. An eye-testing device having an opening therein, a slide movable in said opening and having a plurality of pairs of sight-openings disposed in straight series and arranged to be brought successively to position opposite to the line of vision of a user, a strip for each series of sight-openings arranged to be moved to close them, and means whereby glasses are removably secured to said slide with their lenses in alinement with said sight-openings.

2. An eye-testing device having an opening therein, a slide movable in said opening and having a plurality of pairs of sight-openings disposed in straight series and arranged to be brought successively to position opposite to the line of vision of a user, a strip for each series of sight-openings arranged to be moved to close them and having an opening alined with its series, and means whereby eye-glasses are removably secured to said slide with their lenses in alinement with said sight-openings.

3. In an eye-testing device, a slide movable transversely of the line of vision of a user and having a plurality of pairs of sight openings arranged to be brought successively to position opposite to the line of vision of a user, a strip for each series of sight-openings arranged to be moved to close them, and means whereby glasses are secured to said slide with their lenses in alinement with said sight-openings.

In testimony whereof I affix my signature in presence of two witnesses.

CHARLES G. HERRICK.

Witnesses:
  EVA DAY,
  J. E. COOK.

Copies of this patent may be obtained for five cents each, by addressing the "Commissioner of Patents, Washington, D. C."